US010099125B2

(12) United States Patent
Kondo et al.

(10) Patent No.: US 10,099,125 B2
(45) Date of Patent: Oct. 16, 2018

(54) GAME SYSTEM, NON-TRANSITORY STORAGE MEDIUM ENCODED WITH COMPUTER READABLE PROCESSING PROGRAM, PROCESSING METHOD, GAME DEVICE, AND INFORMATION PROCESSING APPARATUS

(71) Applicant: NINTENDO CO., LTD., Kyoto-shi, Kyoto (JP)

(72) Inventors: Yoshihisa Kondo, Kyoto (JP); Sho Kurose, Kyoto (JP); Yuki Mizuguchi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 0 days.

(21) Appl. No.: 15/434,447

(22) Filed: Feb. 16, 2017

(65) Prior Publication Data

US 2017/0291105 A1    Oct. 12, 2017

(30) Foreign Application Priority Data

Apr. 11, 2016   (JP) .................................. 2016-078883

(51) Int. Cl.
| | |
|---|---|
| *G06F 17/00* | (2006.01) |
| *A63F 13/31* | (2014.01) |
| *A63F 13/327* | (2014.01) |
| *H04W 28/00* | (2009.01) |
| *A63F 13/92* | (2014.01) |

(52) U.S. Cl.
CPC ............ *A63F 13/31* (2014.09); *A63F 13/327* (2014.09); *A63F 13/92* (2014.09); *H04W 28/00* (2013.01)

(58) Field of Classification Search
None
See application file for complete search history.

(56) References Cited

U.S. PATENT DOCUMENTS

| | | | | |
|---|---|---|---|---|
| 8,795,083 | B2* | 8/2014 | Sasaki .................... | H04L 67/38 463/40 |
| 9,801,039 | B2* | 10/2017 | Oren ...................... | H04W 8/005 |
| 2013/0176099 | A1 | 7/2013 | Nakayama | |
| 2015/0109981 | A1* | 4/2015 | Patil .................... | H04L 67/1078 370/311 |
| 2015/0341776 | A1 | 11/2015 | Nakayama | |

FOREIGN PATENT DOCUMENTS

| | | |
|---|---|---|
| JP | 2013-143584 | 7/2013 |
| JP | 5391428 | 1/2014 |

* cited by examiner

*Primary Examiner* — Ronald Laneau
(74) *Attorney, Agent, or Firm* — Nixon & Vanderhye, P.C.

(57) ABSTRACT

A game system including first and second game devices is provided. Each of the first and second game devices includes a communication function for communication by using any one communication channel of a plurality of predetermined communication channels. The first game device switches from a first communication channel being used to a second communication channel other than the first communication channel and broadcasts a frame including data, and switches back to the first communication channel and continues original communication after broadcasting. When the second game device receives the frame through the second communication channel, it performs processing of the received frame.

18 Claims, 10 Drawing Sheets

GAME SYSTEM, NON-TRANSITORY STORAGE MEDIUM ENCODED WITH COMPUTER READABLE PROCESSING PROGRAM, PROCESSING METHOD, GAME DEVICE, AND INFORMATION PROCESSING APPARATUS

This nonprovisional application is based on Japanese Patent Application No. 2016-078883 filed with the Japan Patent Office on Apr. 11, 2016, the entire contents of which are hereby incorporated by reference.

FIELD

The present disclosure relates to a game system including game devices having a communication function for communication by using any one communication channel of a plurality of communication channels, a non-transitory storage medium encoded with a computer readable processing program executed by the game system and a processing method, and a game device and an information processing apparatus directed to the game system.

BACKGROUND AND SUMMARY

In typical radio communication, communication is carried out by selecting any one communication channel in accordance with a communication condition in the surroundings among a plurality of communication channels prepared in advance. In such radio communication, connection should be established by search by a plurality of communication devices for a communication channel which can be used among them.

For example, a method for establishing connection by transmission by a communication device of a search request signal (a probe request) to other communication devices by broadcasting and transmission by another communication device that has received the probe request of a search response signal (a probe response) to the communication device which has transmitted the probe request has been known.

When data is transmitted and received between communication devices, connection should be established in advance by using a probe request and a probe response.

The present disclosure provides a configuration allowing exchange of various types of data in a relatively simple procedure without establishing connection in advance among a plurality of game devices.

An exemplary embodiment provides a game system that includes first and second game devices. Each of the first and second game devices includes a communication function for communication by using any one communication channel of a plurality of predetermined communication channels. The first game device switches from a first communication channel being used to a second communication channel other than the first communication channel and broadcasts a frame including data, and switches back to the first communication channel and continues original communication after broadcasting. When the second game device receives the frame through the second communication channel, it performs processing of the received frame.

The first game device may immediately switch back to the first communication channel after it broadcasts the frame, without communicating with a game device which receives the frame.

The first game device may switch again to a third communication channel other than the first communication channel while it continues the original communication and broadcast the frame.

The data in the frame may include information on a game application executed in the first game device, in which communication is used.

When the second game device is executing an application different from the game application executed in the first game device, it may simultaneously present information on the game application included in the received frame together with an image of the application being executed.

The second game device may present information based on the data included in the received frame.

The second game device may switch to the first communication channel based on the received frame and communicate with the first game device.

The first game device may broadcast the frame also through the first communication channel.

The second game device may scan a frame broadcast from the first game device independently of an application being executed.

The first game device may suspend communication by unicast or multicast and broadcast the frame.

Communication through a communication channel may be carried out between a game device functioning as a master and a game device functioning as a slave. The first game device may broadcast the frame whether it is any of the master and the slave.

The data in the frame may include information on the first communication channel.

The data in the frame may include identification information on a communication group to which the first game device belongs. The second game device may determine whether to use the data included in the received frame based on the identification information.

When the second game device newly receives a frame including data different from the data included in a previously received frame, it may perform processing of the newly received frame.

An exemplary embodiment provides a non-transitory storage medium encoded with a computer readable processing program. The processing program is executed in a game device including a communication function for communication by using any one communication channel of a plurality of predetermined communication channels. The processing program causes the game device to switch from a first communication channel being used to a second communication channel other than the first communication channel and broadcast a frame including data. When another game device receives the frame through the second communication channel, it performs processing of the received frame. The processing program further causes the game device to switch back to the first communication channel and continue original communication after broadcasting.

An exemplary embodiment provides a processing method performed in a game device including a communication function for communication by using any one communication channel of a plurality of predetermined communication channels. The processing method includes switching from a first communication channel being used to a second communication channel other than the first communication channel and broadcasting a frame including data. When another game device receives the frame through the second communication channel, it performs processing of the received frame. The processing method includes switching back to the first communication channel and continuing original communication after broadcasting.

An exemplary embodiment provides a game device. The game device includes a communication function for communication by using any one communication channel of a plurality of predetermined communication channels and a function to switch from a first communication channel being used to a second communication channel other than the first communication channel and broadcast a frame including data and to switch back to the first communication channel and continue original communication after broadcasting. When another game device receives the frame through the second communication channel, it performs processing of the received frame.

An exemplary embodiment provides an information processing apparatus. The information processing apparatus includes a mode setting module for setting any of a first mode for operating as a master device and a second mode for operating as a slave device, a communication control module for communicating with another information processing apparatus in a mode set by the mode setting module, and a frame transmission module for suspending communication being carried out by the communication control module and for broadcasting a frame including data regardless of whether the mode set by the mode setting module is the first mode or the second mode.

The foregoing and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
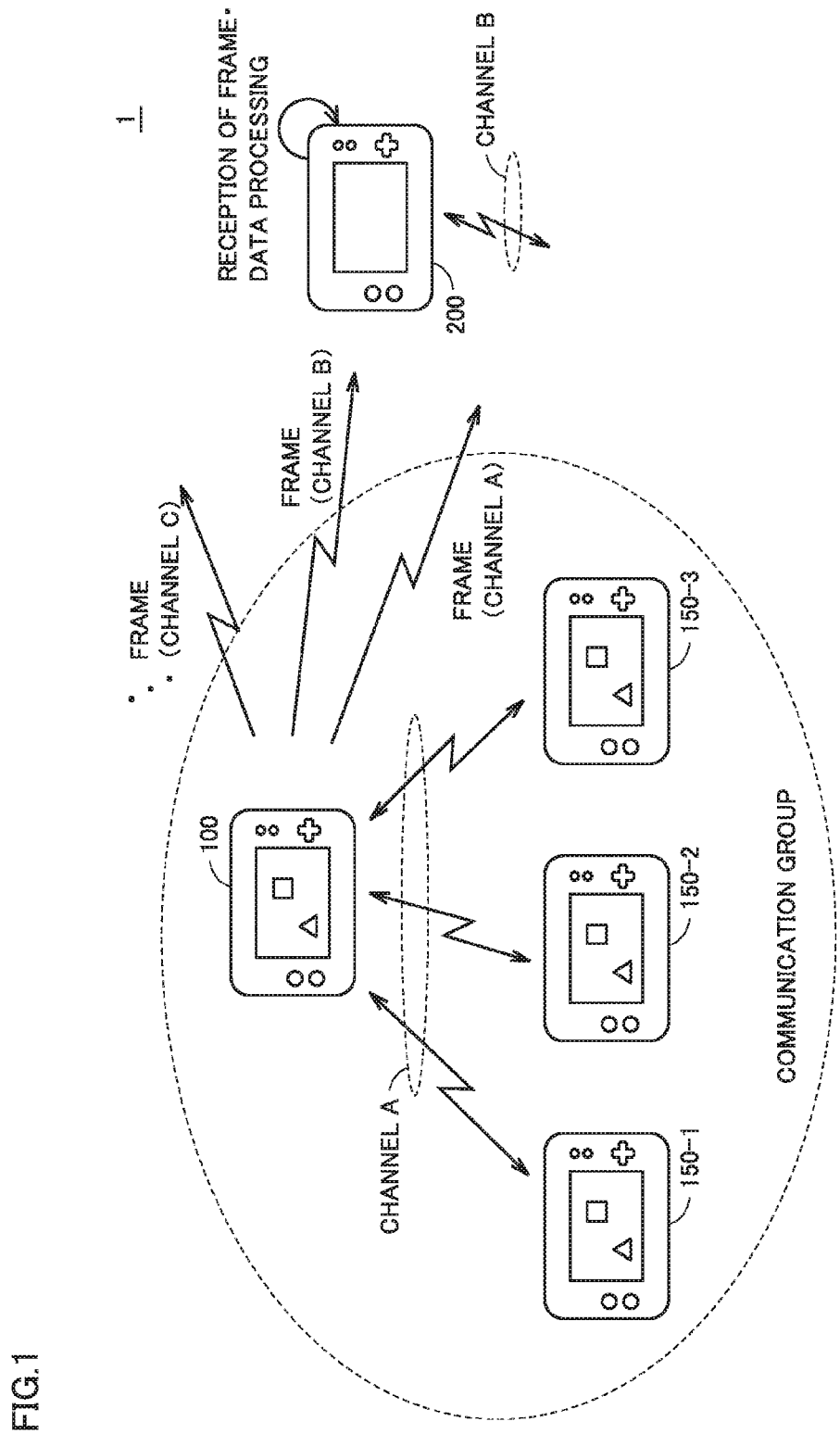
FIG. 1 shows an exemplary illustrative non-limiting drawing illustrating overview of a game system according to the present embodiment.

The present embodiment will be described in detail with reference to the drawings. The same or corresponding elements in the drawings have the same reference characters allotted and description thereof will not be repeated.

A. Game System

Overview of a game system 1 according to the present embodiment will be described.

Referring to FIG. 1, game system 1 includes a plurality of game devices 100, 150-1, 150-2, 150-3, . . . , 200, . . . which can exchange information with one another through radio communication. Each of the game devices represents a type of an information processing apparatus and has a communication function for communication by using any one communication channel of a plurality of predetermined communication channels. Each of the game devices can establish radio communication with other game devices in accordance with an application to be executed.

For example, a short-range radio scheme such as wireless local area network (LAN) under Institute of Electrical and Electronic Engineers (IEEE) 802.11 standards, Bluetooth® under IEEE 802.15.1 standards, ZigBee® under IEEE 802.15.4 standards, or infrared communication can be employed for radio communication. Alternatively, device to device (D2D) communication under long term evolution (LTD) standards can be employed.

FIG. 1 shows a state that game device 100 and game devices 150-1 to 150-3 execute an application for exchanging data through communication and these game devices form the same communication group.

In one form of a communication group, one game device of a plurality of game devices belonging to a communication group functions as a master and other game devices function as slaves. The "master" and the "slave" herein mean attributes used mainly for distinction (ordering) in communication processing. The "master" and the "slave" correspond to a type of a mode.

Among a plurality of game devices, a game device functioning as the "master" may be determined in a fixed manner under a predetermined rule or determined regularly or irregularly every prescribed time interval or every prescribed event. Game devices other than the game device functioning as the "master" function as "slaves". Thus, each of the game devices has a mode setting function to set any of a "master" mode for operating as a master device and a "slave" mode as a slave device based on internal determination or an external command.

For example, the "master" may manage a communication channel to be used in a communication group of interest or identification information specifying the communication group, and may control timing of transmission by a "slave". The "slave" transmits data to be transmitted in accordance with an instruction from the "master". In general, each game device can function as any of the master and the slave, and a game device to function as the master is determined in accordance with timing of execution or contents of execution of an application in each game device. For example, when a certain application is executed in a certain game device and a communication group is formed as a user of that game device invites participation in a game and users of other game devices accept the invitation, the game device which initially invited participation may function as the master. Only a specific game device may be allowed to function as the master. Thus, in a certain communication group, communication through a communication channel is carried out between a game device functioning as the master and game devices functioning as slaves.

Thus, each game device communicates with other game devices (information processing apparatuses) in a set mode ("master" or "slave").

For example, a game device functioning as the "master" may have a game device functioning as the "slave" sense and monitor a communication group by intermittently transmitting a prescribed beacon signal including an identifier of the master game device.

Similarly to distinction between the "master" and the "slave", distinction between a "parent" and a "child" may also be adopted.

In the description below, game devices belonging to a certain communication group may be referred to as a "master" (or a "master device") or a "slave" (or a "slave device") as being distinguished from each other with attention being paid to a function thereof.

In a state shown in FIG. 1, each game device can use any communication channel of a plurality of communication channels (a channel A, a channel B, a channel C, . . . ), and in a communication group including game device 100 and game devices 150-1 to 150-3, data is exchanged through channel A. In such a state, game device 100 suspends communication through channel A among game devices 150-1 to 150-3 and broadcasts a frame including any data through another communication channel Game device 100 switches from a first communication channel (channel A) being used to a second communication channel (channel B, channel C, . . . ) other than the first communication channel (channel A) and broadcasts a frame including data. As a series of broadcast processes ends, original communication is continued by switching back to the first communication channel (channel A).

It is assumed here that game device 200 is communicating through channel B. When game device 200 receives from game device 100 any frame successively transmitted with communication channels being varied, game device 200 processes the received frame and presents or outputs a result of processing as necessary. In the example shown in FIG. 1, game device 200 can receive a frame broadcast by game device 100 through channel B. Thus, when game device 200 uses the second communication channel (channel B, channel C, . . . ) and receives a frame through the second communication channel, it performs processing of the received frame.

Though data included in the frame broadcast by game device 100 is not particularly limited, for example, it may include information on an application (a game application) executed in the communication group including game device 100 in which communication is used. More specifically, information such as information on progress of the application (game application) being executed, victory or defeat, participating users, or whether or not new users are being invited may be included. When game device 200 receives a frame including such information, it may give a notification about the received information on a display thereof. As a user of game device 200 sees such a notification, the user may join the communication group including game device 100.

In the example shown in FIG. 1, though game device 200 communicates through a communication channel different from that used among game device 100 and game devices 150-1 to 150-3, it can receive information on the application executed in the communication group including game device 100 by receiving the frame broadcast from game device 100. Thus, in game system 1 according to the present embodiment, various types of data can be exchanged in a relatively simple procedure without establishing connection in advance among a plurality of game devices.

For the sake of convenience of description, FIG. 1 shows an example in which game device 100 and game devices 150-1 to 150-3 form a communication group, however, they do not necessarily have to form a communication group. For example, when game device 100 is connected to an access point through a certain communication channel while it is executing some application in which communication is used as well, it may transmit a frame to other game devices.

A game device which receives a frame (in the example shown in FIG. 1, game device 200) may be in a non-communicating state such as a stand-by state. Game device 200 may activate a communication function every prescribed period or every event in the stand-by state and check whether or not it has received some data (a scanning operation).

Broadcasting of a frame as described above may be performed by using, for example, action frames defined in wireless LAN or by using an Advertising packet in Bluetooth® low energy (BLE) defined under Bluetooth®.

Though FIG. 1 shows a configuration in which only game device 100 functioning as the master broadcasts a frame for the sake of convenience of description, some or all of game devices 150-1 to 150-3 functioning as the slaves may broadcast a frame. This is also applicable to the description below. Here, a frame broadcast from another game device belonging to the same communication group may be subjected to no substantial processing and a received frame may be discarded.

Though data included in frames transmitted from the master and the slave may substantially be the same, data in accordance with each function may be included. For example, a frame broadcast from the master may include information on a network such as a communication group and a communication channel being used, and a frame broadcast from the slave may include information on a user of a game device functioning as the slave (a profile of a user or character information corresponding to the user).

The game device functioning as the slave may broadcast a frame in response to an instruction from the master or broadcast a frame in accordance with its own condition independently of the master.

Thus, even when local communication is carried out among specific game devices, information can more freely be exchanged with a game device belonging to another communication group or a game device which is not communicating.

B. Hardware Configuration of Game Device

A hardware configuration of a game device included in game system 1 will now be described. Typically, game devices are identical in hardware configuration to one another and description will be given below with reference to game device 100 by way of example. Game device 150 and game device 200 shown in FIG. 1 will also be described as being identical in hardware configuration to game device 100 by way of a typical example. Game devices may be different from one another in hardware configuration.

Any computer having a communication function can be employed as game device 100. Though an example of mount as a portable (or a mobile) game device will be described below, a stationary game device may be mounted without being limited as such.

Figure 2:
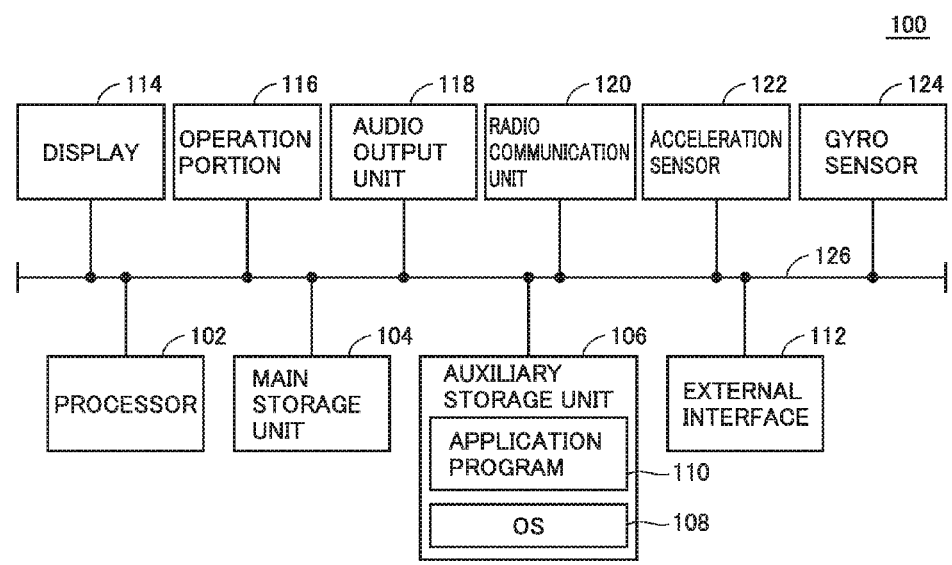
FIG. 2 shows an exemplary illustrative non-limiting drawing illustrating a hardware configuration of a game device included in the game system according to the present embodiment.

Referring to FIG. 2, game device 100 includes a processor 102, a main storage unit 104, an auxiliary storage unit 106, an external interface 112, a display 114, an operation portion 116, an audio output unit 118, a radio communication unit 120, an acceleration sensor 122, and a gyro sensor 124. These components are connected to one another to be able to communicate data through a bus 126.

Processor 102 is a processing entity (processing function) for performing processing provided by game device 100. Processor 102 reads an operating system (OS) 108 and an application program 110 stored in auxiliary storage unit 106, develops the operating system and the application program on main storage unit 104, and performs game processing and information processing as will be described later.

Main storage unit 104 is any storage device (storage medium) which can be accessed by processor 102, and mounted, for example, as a volatile storage device such as a dynamic random access memory (DRAM).

Auxiliary storage unit 106 is mounted, for example, as a non-volatile storage medium such as a hard disk or a flash memory. Alternatively, auxiliary storage unit 106 may be mounted, for example, as a storage medium attachable to and removable from game device 100 such as an optical disc and a cartridge. In this case, combination of game device 100 and any storage medium may be configured as a game system.

External interface 112 mediates exchange of data with any memory card or an external device. External interface 112 is mounted, for example, as a reader-writer which reads and writes data by being electrically connected to a memory card and a universal serial bus (USB) interface which exchanges data with an external device.

Display 114 presents an image generated as a result of information processing performed by processor 102. Display 114 may present an image received from another apparatus. A plurality of displays 114 may be provided. Game device 100 may make use of another display or a plurality of other displays.

Operation portion 116 mainly accepts an operation from a user of game device 100. Operation portion 116 is mounted, for example, as a push button, an operation lever, a touch panel, or a mouse. Alternatively, a controller separate from game device 100 and connected through a wire or wirelessly may be adopted as operation portion 116.

Audio output unit 118 outputs voice and sound generated as a result of information processing performed by processor 102. Voice and sound received from another apparatus may be output to audio output unit 118. Audio output unit 118 is mounted, for example, as one speaker or a plurality of speakers arranged around the display and an amplifier driving the speaker. Alternatively, audio output unit 118 may be mounted as a connector for electrical connection to a headphone and an amplifier driving the headphone connected via the connector.

Radio communication unit 120 transmits and receives data to and from another apparatus through a radio signal. Radio communication unit 120 supports such a communication scheme as wireless LAN, Bluetooth®, ZigBee, and infrared communication. Though FIG. 2 collectively shows a block of radio communication unit 120, a plurality of types of radio communication functions may be mounted or a plurality of radio communication functions of a single type may be prepared. Radio communication unit 120 may be integrated with processor 102.

Acceleration sensor 122 is a device which detects an acceleration generated in game device 100. Gyro sensor 124 is a device which detects inclination or the like of game device 100. An operation performed by a user who holds game device 100 can be detected with at least one or both of acceleration sensor 122 and gyro sensor 124.

Though FIG. 2 shows game device 100 as an integrated apparatus, the game device may be mounted as an assembly of a plurality of apparatuses. Game device 100 may be mounted as a combination of a plurality of independent apparatuses. For example, a first apparatus including elements corresponding to processor 102, display 114, operation portion 116, and audio output unit 118 and a second apparatus including an element corresponding to radio communication unit 120 may removably be connected to each other. Such a configuration may be referred to as a game system instead of a game device. Alternatively, such a configuration that a main body apparatus including elements corresponding to processor 102, main storage unit 104, and auxiliary storage unit 106 is separate from a terminal apparatus including display 114, operation portion 116, and audio output unit 118 may be adopted.

In another embodiment, at least a part of information processing performed by game device 100 may be performed by another apparatus or a plurality of other apparatuses arranged as being distributed over a network (a wide area network and/or a local network).

Instead of game device 100 as shown in FIG. 2, a function the same as the function of game device 100 described herein may be performed by executing an application on a portable telephone, a smartphone, a tablet, or a general-purpose personal computer.

C. Sequence of Broadcasting of Frame

A sequence involved with broadcasting of a frame mounted on the game device according to the present embodiment will now be described.

Figure 3:
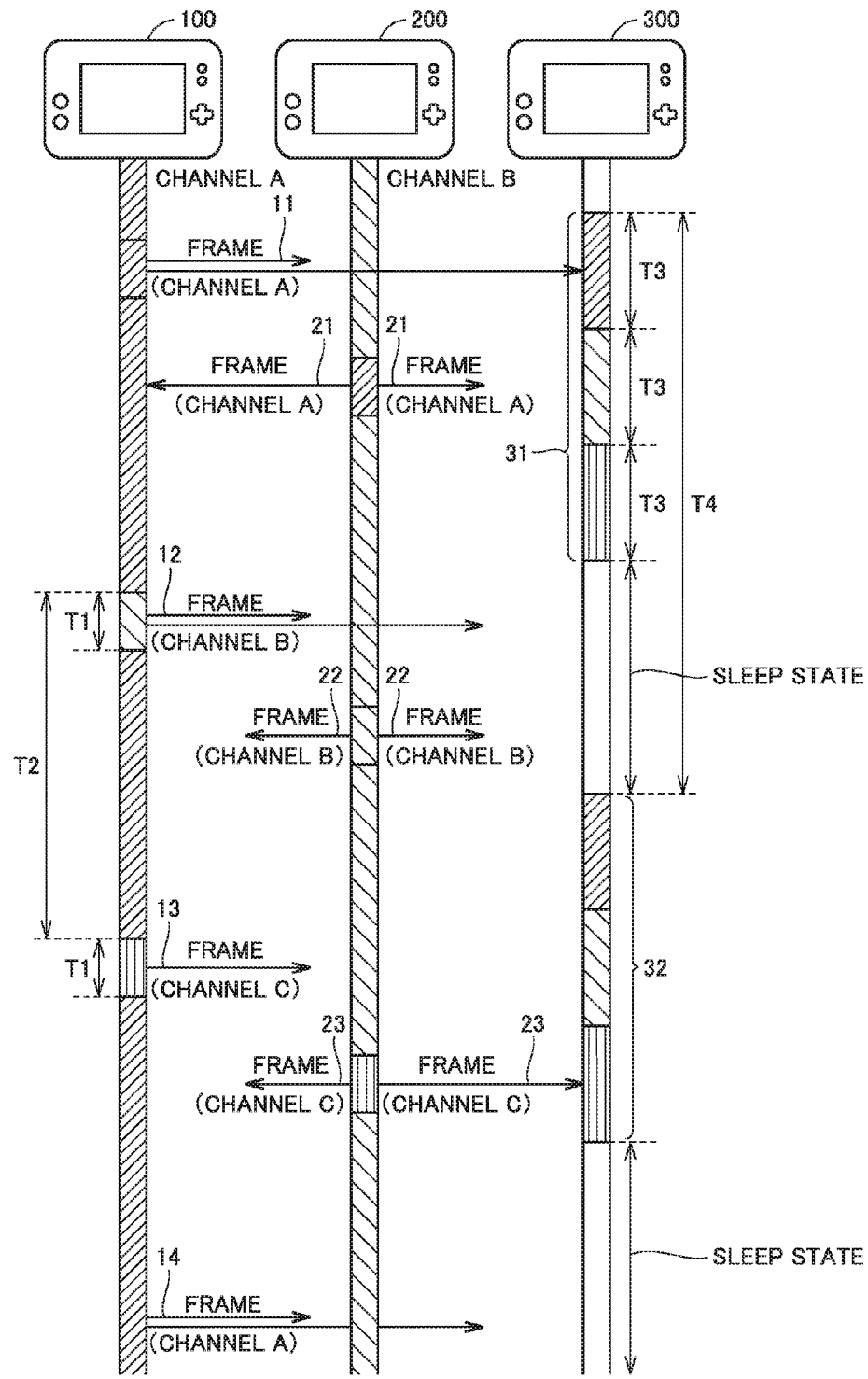
FIG. 3 shows an exemplary illustrative non-limiting drawing illustrating a timing chart showing a sequence when the game device according to the present embodiment broadcasts a frame.

Referring to FIG. 3, three game devices 100, 200, and 300 are present within an area in which they can communicate with one another. For example, game device 100 communicates with other game devices through channel A and game device 200 communicates with other game devices through channel B.

Game device 100 and game device 200 may communicate with an access point for connection to the Internet. Even when a game device is connected to the Internet, it may be able to receive a frame broadcast from a nearby game device.

Game device 300 is not executing an application in which communication is used. A physical layer and a data link layer of radio communication unit 120 of game device 300 are periodically or continuously maintained active so as to perform background scan for searching for a transmitted frame every prescribed period.

For the sake of brevity of description, in the example shown in FIG. 3, three communication channels of channel A, channel B, and a channel C can be used.

Game devices 100 and 200 may typically transmit data to one specific destination by unicast when they communicate with other game devices, or transmit data to a plurality of specific destinations by multicast. When communication is carried out through one communication channel (main communication channel) of a plurality of communication channels, data is not transmitted to an unidentified destination as in broadcasting but transmitted to one specific destination or a plurality of specific destinations.

In such a communication state, game device 100 periodically broadcasts a frame by successively switching among three communication channels including channel A used for main communication. Specifically, game device 100 broadcasts a frame through channel A at certain timing (see a reference 11). Thereafter, game device 100 broadcasts a frame through channel B (see a reference 12). After broadcasting of the frame through channel B, communication is continued by switching to the original communication channel (channel A). Thereafter, game device 100 broadcasts a frame through channel C (see a reference 13). After broadcasting of the frame through channel C, communication is continued by switching to the original communication channel (channel A).

After a certain game device broadcasts a frame through any communication channel, it may continue original communication processing without performing processing for receiving an acknowledgement from another game device which may receive the broadcast frame, in order not to lower performance of original communication processing due to interruption by processing for broadcasting a frame. Thus, game device 100 immediately switches back to the original communication channel after it broadcasts the frame, without communicating with another game device which may receive the frame.

Game device 100 repeats such broadcasting of a frame. As shown in FIG. 3, game device 100 broadcasts a frame also through the first communication channel. By broadcasting a frame through all available communication channels, various types of notifications can be given to game devices which are present in the surroundings. Game device 100 communicates by unicast or multicast through the first communication channel, and when a frame is transmitted through the same communication channel, communication by unicast or multicast is suspended. For example, in the example shown in FIG. 1, game device 100 suspends communication by unicast or multicast through channel A and broadcasts a frame through channel A.

Such broadcasting through channel A to channel C is repeatedly and successively carried out, for example, in a period T2. When broadcasting of a frame through each communication channel is completed, communication through the original communication channel is resumed so that a time period T1 required for broadcasting of each frame is determined in a fixed manner (for example, 1 msec.) in accordance with the time period required for broadcasting of a frame. For redundant broadcasting of a frame, time period T1 required for broadcasting of each frame may arbitrarily be set. In this case, a frame may be broadcast a plurality of times within period T1.

As shown in FIG. 3, after game device 100 broadcasts a frame, it switches back to channel A which is the original communication channel and continues communication. Then, while game device 100 continues original communication, it switches again to a third communication channel (channel B or channel C in the example shown in FIG. 3) other than the first communication channel (channel A) and broadcasts a frame.

Similarly, game device 200 periodically broadcasts a frame by successively switching among three communication channels including channel B used for main communication. Specifically, game device 200 broadcasts a frame through channel A at certain timing (see a reference 21). After broadcasting of a frame through channel A, communication is continued by switching to original communication channel B. Thereafter, game device 200 broadcasts a frame through channel B (see a reference 22). Thereafter, game device 200 broadcasts a frame through channel C (see a reference 23). After broadcasting of a frame through channel C, communication is continued by switching to original communication channel B.

A period of broadcasting of a frame by game device 100 may be the same as or different from a period of broadcasting of a frame by game device 200. Even when a period of broadcasting is the same, game devices are not in synchronization with each other in timing of start of the period, and normally, each game device broadcasts a frame at different timing.

In the example shown in FIG. 3, game device 200 is communicating through channel B at timing at which game device 100 broadcasts a frame through channel B (see reference 12). Therefore, game device 200 can receive the frame broadcast from game device 100.

Since game device 100 is communicating through channel A at timing at which game device 200 broadcasts a frame through channel A (see reference 21), game device 100 can receive the frame broadcast from game device 200.

As shown in FIG. 3, each game device has a function to broadcast a frame including data with earlier communication by using the communication function being suspended regardless of whether the set mode thereof is the "master" or the "slave". Though game device 100 and game device 200 thus communicate with other game devices through communication channels different from each other, they can obtain information on each other included in broadcast frames.

Game device 300 carries out background scan periodically or every event, and when it is able to search for data transmitted through an available communication channel and to receive some data, it can perform necessary processing on the received data.

In the example shown in FIG. 3, game device 300 carries out background scan in a period T4. By way of example of background scan, game device 300 waits for reception through channel A for a time period T3, thereafter waits for reception through channel B for time period T3, and thereafter waits for reception through channel C for time period T3 (see a reference 31). Then, game device 300 stands by in a rest state (a sleep state) for a prescribed period, similarly waits again for reception through channel A for time period T3, thereafter waits for reception through channel B for time period T3, and thereafter waits for reception through channel C for time period T3 (see a reference 32). By waiting for reception through each communication channel by switching among communication channels in period T3, a frame transmitted from another game device can be received.

Though FIG. 3 shows a method of successively switching among three communication channels, a method of switching among communication channels every period T4 may be adopted without being limited as such. Such a sequence as waiting for reception through channel A, standing by in a rest state (sleep state) for period T4, and in succession waiting for reception through channel B may be adopted.

In the example shown in FIG. 3, game device 300 can receive a frame broadcast through channel A from game device 100 during a period in which it waits for reception through channel A in first background scan (see reference 31). Game device 300 can receive a frame broadcast through channel C from game device 200 during a period in which it waits for reception through channel B in second background scan (see reference 32).

Background scan may be carried out unless power supply of game device 300 is completely cut off. For example, regardless of whether or not some application is being executed in game device 300, background scan may repeatedly be carried out. Game device 300 may scan a frame broadcast from game device 100 or game device 200 independently of an application being executed.

Though FIG. 3 shows only a transmitted frame for the sake of convenience of description, a beacon including information on a communication channel may be transmitted for a prescribed period before transmission of a frame. Such transmission of a beacon can further ensure reception by a game device in a stand-by state.

Even game device 300 which is not executing an application in which communication is used can receive a frame broadcast from other game devices and can obtain information included in the received frame.

Though processing for broadcasting a frame through each channel when game device 100 is executing an application in which communication is used has been exemplified in the description above, a frame may periodically be broadcast through each channel even when game device 100 is not executing an application in which communication is used.

D. Applications

Some applications of a notification by using a frame as described above will now be described.

d1: Notification of and Participation in Game Application Being Executed

One example of a form of use of game system 1 according to the present embodiment will be described with reference to FIGS. 4A to 4C.

Figure 4:
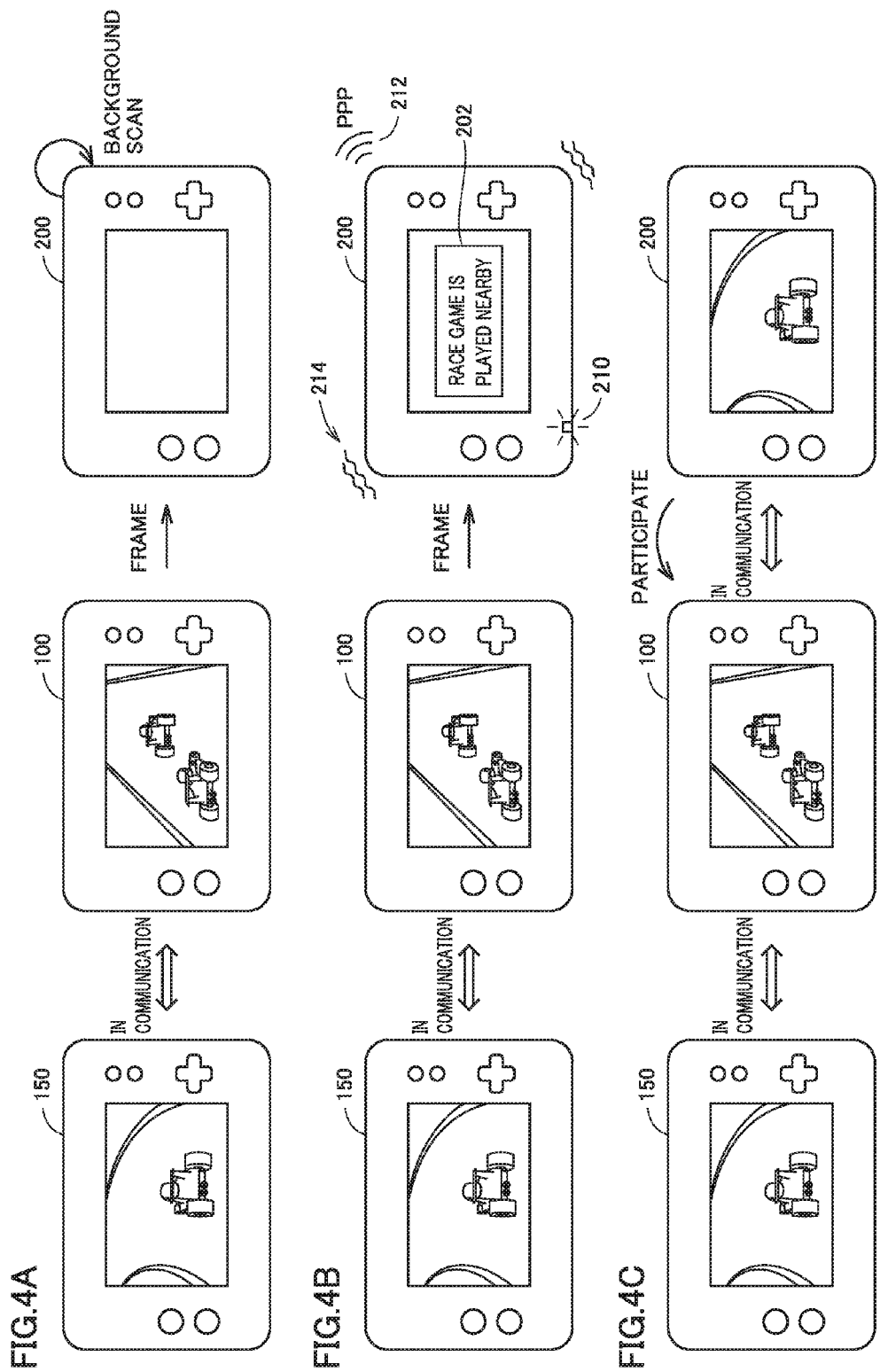
FIGS. 4A-4C show exemplary illustrative non-limiting drawings each illustrating one example of a form of use of the game system according to the present embodiment.

FIG. 4A shows an example in which game device 100 and game device 150 execute a game application in which communication is used. Specifically, game device 100 functions as the master, game device 150 functions as the slave, and users of the game devices play a match-up type game application. Game device 200 is not executing any application. Game device 200, however, carries out background scan, and periodically searches for a frame transmitted from other game devices.

In such a state, game device 200 receives some frame from game device 100. This frame includes information on a game application executed by game device 100 in which communication is used. Then, as shown in FIG. 4B, game device 200 performs an operation to give a notification to a user in accordance with contents of the received frame. This operation for notification may include, for example, turn-on/blinking of any indicator arranged as being exposed at a surface of game device 200 (see a reference 210), generation of notification sound from a speaker attached to game device 200 (see a reference 212), and vibration (a reference 214) of a main body of game device 200. By giving a visual, aural, or tactile stimulus to a user, a notification based on a received frame may be given.

For example, a frame broadcast from game device 100 includes information on a game application executed by game device 100 and a message 202 "race game is played nearby" may be presented on the display of game device 200 based on such information.

Game device 200 may present a screen for accepting an operation to watch or participate in the game application being executed, in response to such message 202. Then, as shown in FIG. 4C, game device 200 may also join a communication group including game device 100 and game device 150 and execute the game application.

Figure 5:
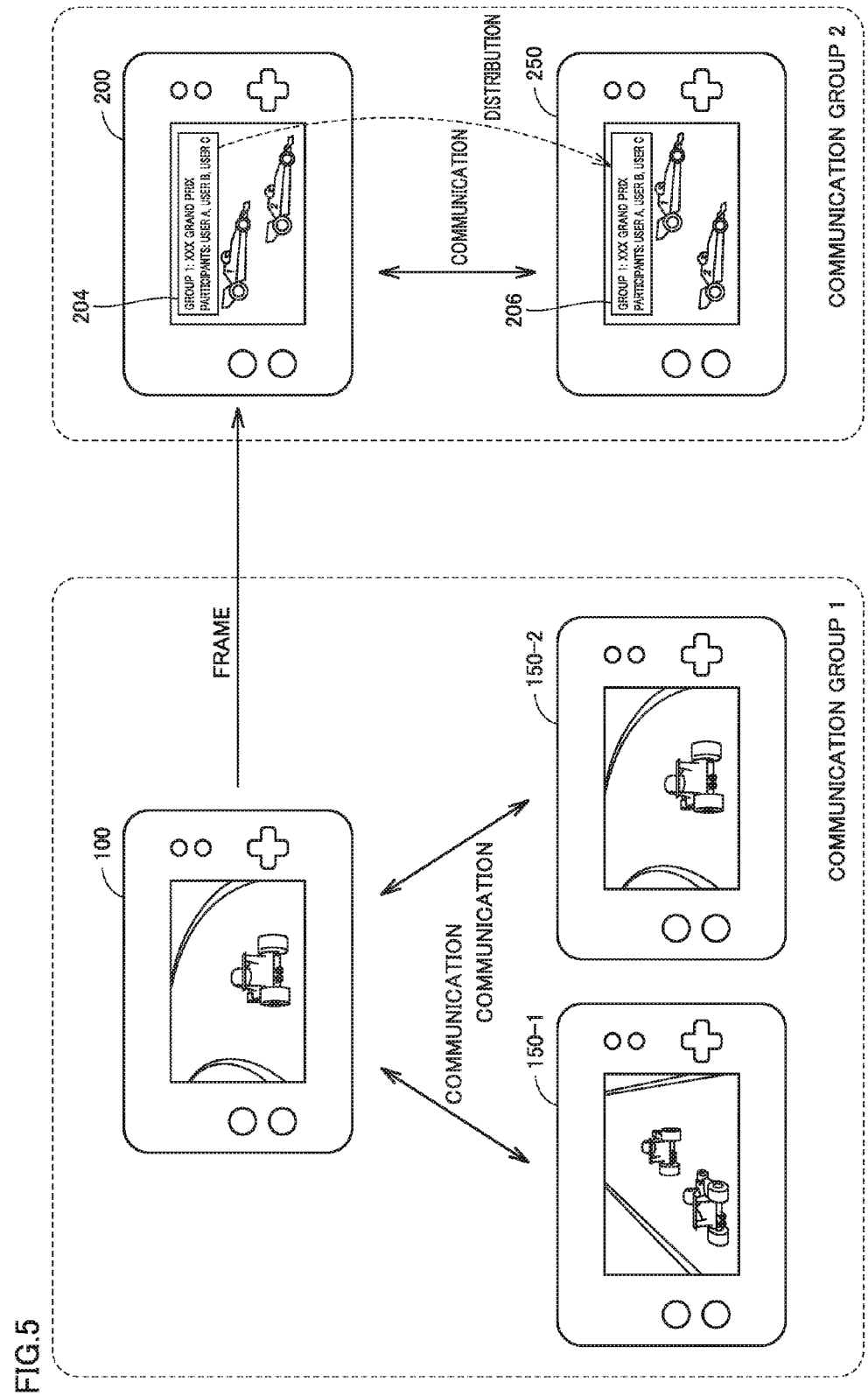
FIG. 5 shows an exemplary illustrative non-limiting drawing illustrating another example of a form of use of the game system according to the present embodiment.

Data included in the frame broadcast from game device 100 includes information on a communication channel used by game device 100. Game device 200 specifies a communication channel used in the communication group which game device 200 joins, based on the information on the communication channel in this frame. Information on the communication channel may be transmitted as being included in a beacon, in addition to or instead of a frame broadcast from game device 100.

d2: Notification of and Participation in Application Being Executed in Another Communication Group Another example of a form of use of game system 1 according to the present embodiment will be described with reference to FIG. 5. FIG. 5 shows an example in which two communication groups are formed. Specifically, a communication group 1 includes game device 100 functioning as the master and game devices 150-1 and 150-2 functioning as the slaves, and a communication group 2 includes game device 200 functioning as the master and a game device 250 functioning as the slave.

In communication group 1, a game application in which communication is used is executed. In communication group 2, an application different from the game application executed in communication group 1 is executed.

A frame transmitted from the game device functioning as the master in each communication group includes information on a game application executed by each game device in which communication is used. For example, when game device 200 which is the master of communication group 2 receives a frame broadcast from game device 100 which is the master of communication group 1, game device 200 may be notified of a condition of the game application executed in communication group 1.

When game device 200 is executing an application different from the game application executed in game device 100, it may simultaneously present information on the game application executed in game device 100 included in the received frame, together with an image of the game application being executed. By way of a specific example, a name of an application executed in game device 100 such as "group 1: xxx grand prix" or a message 204 including a name of a participating user such as "participants; user A, user B, user C" may be shown.

Information based on the frame received by game device 200 may be distributed to game device 250 which is the slave. In this case, game device 250 may present a message 206 similar to the message presented on game device 200. Contents of message 206 presented on game device 250 do not have to be the same as the contents presented on game device 200, but more information may simultaneously be presented or the contents may be presented in a more simplified manner.

Thus, a game device which has received a frame presents information based on data included in the received frame. With such representation of the information, game devices belonging to one communication group can share a condition of a game application in another communication group, a cue for participation in another communication group is given, and fun of the game application can be greater.

Figure 6:
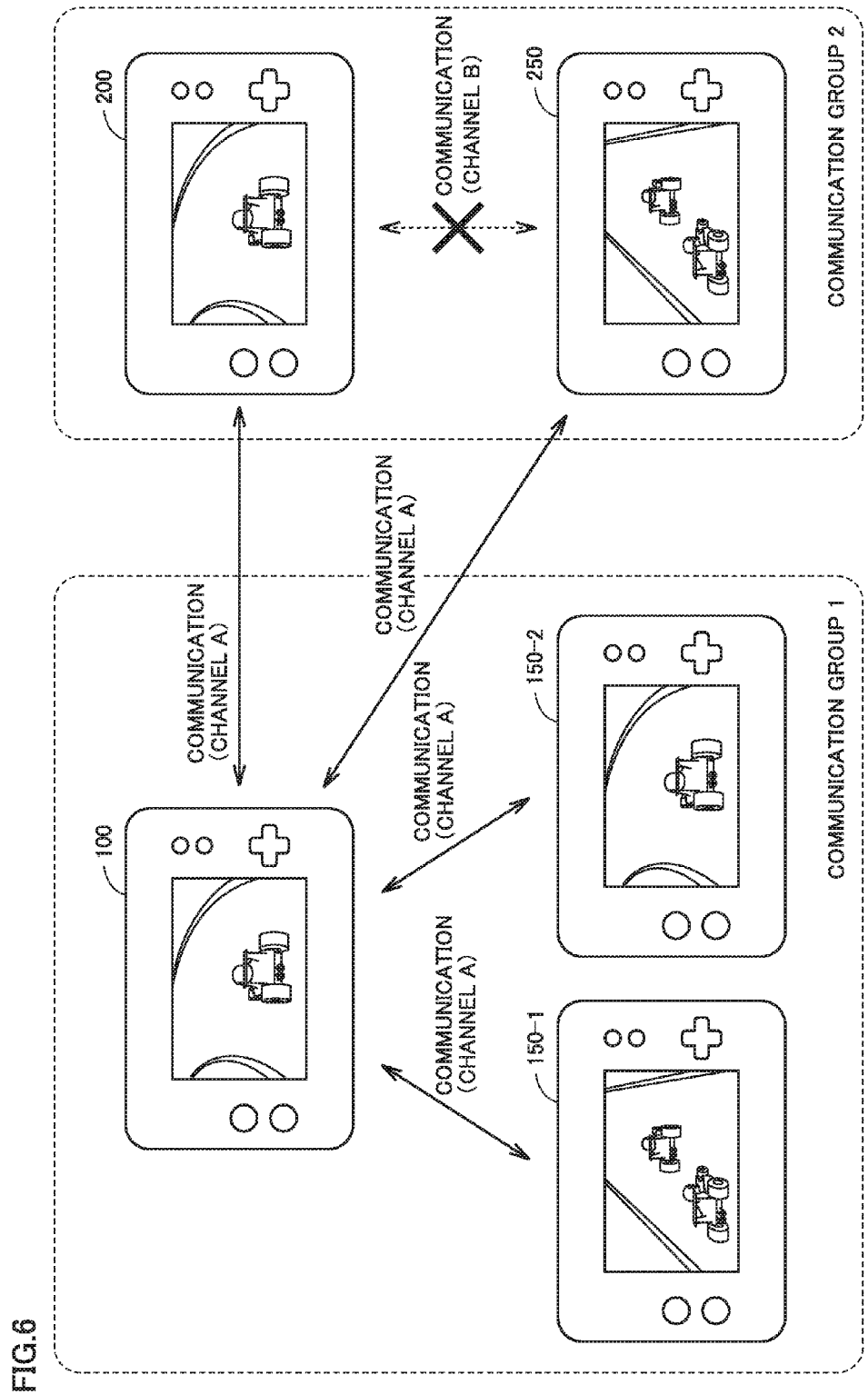
FIG. 6 shows an exemplary illustrative non-limiting drawing illustrating a state in which a game device belonging to a communication group 2 joins a communication group 1 in the state shown in FIG. 5.

In the state shown in FIG. 5, some or all of the game devices belonging to communication group 2 may join communication group 1. FIG. 6 shows a state that the game devices belonging to communication group 2 join communication group 1 in the state shown in FIG. 5.

As shown in FIG. 6, for example, users of game device 200 and game device 250 see a message based on data included in a frame broadcast from game device 100 belonging to communication group 1 and can perform also an operation to participate in the game application executed in communication group 1.

For example, communication is carried out through channel A in communication group 1 and communication is carried out through channel B in communication group 2. In this case, game device 200 and game device 250 belonging to communication group 2 switch the communication channel to be used from channel B to channel A and continue original communication. Game device 200 and game device 250 switch to a communication channel used by game device 100 based on the received frame and communicate with game device 100.

As described above, data in a frame broadcast from game device 100 may include information on a communication channel used by game device 100. By including such information on a communication channel, processing at the time when a game device which has received a frame joins a communication group to which a game device which has broadcast the frame belongs can be more simplified.

d3: Watching of Game Application Being Executed

Though a processing example in which a game device which has received a broadcast frame joins a communication group to which a game device which has broadcast the frame belongs has been described above, processing only for watching a scene of a game application executed in the communication group may be selected. In the case of participation, information on progress of a game is presented on a game device which has participated and an operation by a user on the game device is transmitted also to other game devices. In the case of watching, though information on progress of a game is provided to a watching game device, an operation by a user on that game device is not transmitted to other game devices.

In any case of participation and watching, information such as image data and audio data generated with progress of a game of the game application executed in the game devices is continually transmitted to a participating or watching game device. In the case of participation, communication processing is switched such that an operation by a user onto a newly participating game device is transmitted to other interacting game devices from that game device.

In any case, basically, switching to a communication channel used in a communication group of interest should be made.

The applications described above are merely by way of example and a notification by using a frame according to the present embodiment can be applied to various aspects.

E. Data Structure of Frame

Figure 7:
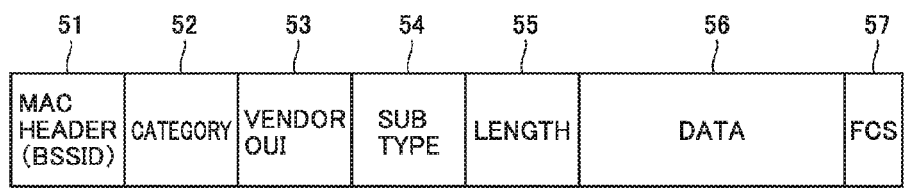
FIG. 7 shows an exemplary illustrative non-limiting drawing illustrating one example of a data structure of a frame transmitted by the game device according to the present embodiment.

One example of a data structure of a frame transmitted by a game device according to the present embodiment will now be described with reference to FIG. 7. FIG. 7 shows an exemplary structure of a frame 50 used in mounting of wireless LAN under IEEE 802.11 standards as a typical example.

Referring to FIG. 7, frame 50 includes a media access control address (MAC) header portion 51, a category portion 52, a vendor organizationally unique identifier (OUI) portion 53, a sub type portion 54, a length portion 55, a data portion 56, and a frame check sequence (FCS) portion 57.

MAC header portion 51 typically stores a basic service set identifier (BSSID) as an identifier specifying a communication group. A MAC address of a game device functioning as the master is basically used as the BSSID. Data in frame 50 includes identification information on a communication group to which a game device which broadcasts frame 50 belongs. A game device which has received frame 50 can determine whether or not a frame is frame 50 transmitted from another communication group based on a value of the BSSID stored in MAC header portion 51. The game device which has received frame 50 may determine whether or not to use data included in received frame 50 based on identification information in frame 50. For example, when a game device belonging to a certain communication group receives frame 50 transmitted from another game device belonging to the same communication group, it performs processing for discarding that frame 50. On the other hand, a game device may perform processing used for presenting frame 50 transmitted from a game device belonging to another communication group. Though a frame may be transmitted or received within the same communication group, processing of the frame can be more efficient by not using information on such a frame, based on the BSSID or the MAC address.

Category portion 52 stores information specific to a vendor. Basically, a special value in accordance with a manufacturer of a game device is set in category portion 52. Vendor OUI portion 53 typically stores information for specifying a vendor. Basically, a specific value in accordance with a manufacturer of a game device is set in vendor OUI portion 53.

By allocating information specific to game system 1 according to the present embodiment to category portion 52 and vendor OUI portion 53, only a game device on which the function according to the present embodiment is mounted receives and processes a frame, so that any data can be stored without influencing other communication devices.

Sub type portion 54 stores identification information presenting applications of frame 50. For example, identification information indicating use as an action frame for giving a notification as described above or use as a search request signal (probe request) or a search response signal (probe response) for establishing connection is stored.

Length portion 55 stores information indicating a length of data stored in data portion 56. Data portion 56 stores a main body of data transmitted in frame 50.

FCS portion 57 stores a cyclic redundancy check (CRC) value used for detection of a data error.

Data portion 56 can store any data and may include information on a game application executed in a sender game device in which communication is used, as described above.

F. Software Configuration of Game Device

Figure 8:
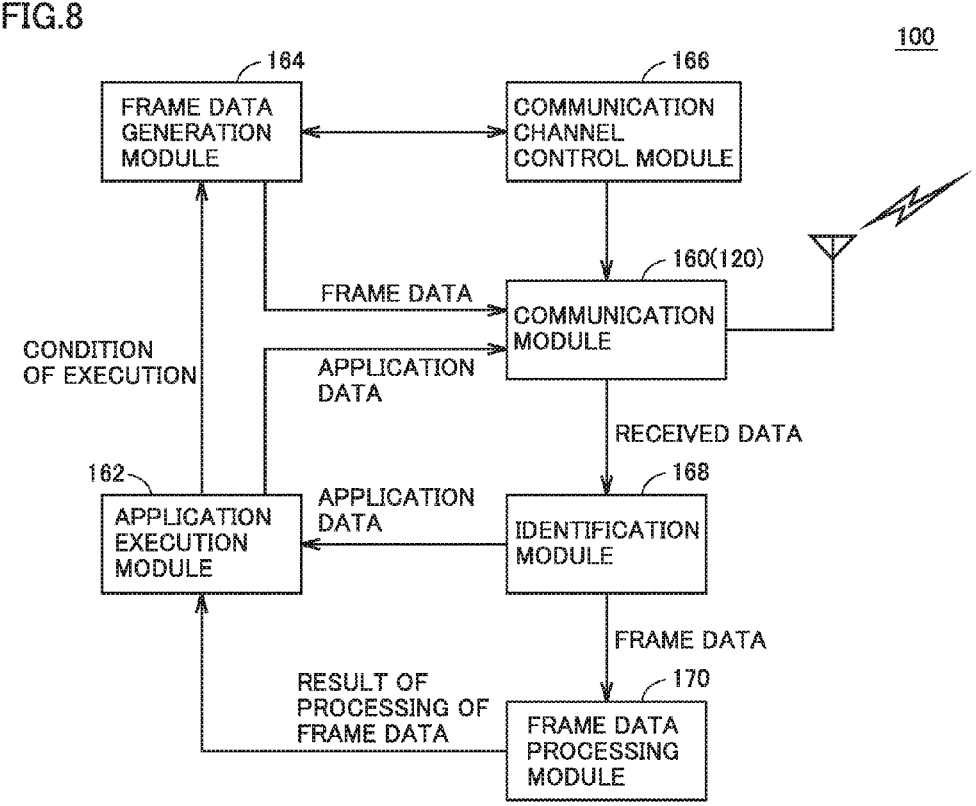
FIG. 8 shows an exemplary illustrative non-limiting drawing illustrating a software configuration of the game device included in the game system according to the present embodiment.

A software configuration of a game device according to the present embodiment will now be described with reference to FIG. 8. Each module included in the game device shown in FIG. 8 is typically implemented by execution of operating system 108 and application program 110 by processor 102. A part or the entirety of each module shown in FIG. 8 may be mounted by using such hardware as an application specific integrated circuit (ASIC) instead of mounting the module as a software module.

Referring to FIG. 8, game device 100 includes, as its software components, a communication module 160, an application execution module 162, a frame data generation module 164, a communication channel control module 166, an identification module 168, and a frame data processing module 170.

Communication module 160 is an entity which carries out actual radio communication and implemented in its entirety or in part by radio communication unit 120 (FIG. 2).

Application execution module 162 is an entity which executes any application such as a game application. For an application in which communication is used, the application execution module generates application data to be transmitted to other game devices with progress of a game and processes progress of the game based on application data received from other game devices.

Frame data generation module 164 generates frame data which is data to be included in a frame, in accordance with a condition of execution of an application by application execution module 162.

Communication channel control module 166 carries out control involved with switching among communication channels as shown in FIG. 3.

Identification module 168 determines whether or not to process data (packet/frame) received by communication module 160 based on information in a header thereof, and outputs data determined to be processed to application execution module 162 or frame data processing module 170.

Frame data processing module 170 processes a frame received from other game devices, processes as appropriate data included in the frame, and outputs the data to application execution module 162 as a frame data processing result. Application execution module 162 has a message as shown in FIGS. 4B and 5 shown based on the frame data processing result. Processing to be performed by frame data processing module 170 can arbitrarily be determined. Alternatively, which processing is to be performed may be selected in accordance with preference set in advance by a user.

When frame data processing module 170 newly receives a frame including data different from the data included in a previously received frame, it may perform processing on the newly received frame. Data the same as the data included in the previously received frame may redundantly be received, and in such a case, the redundantly received data may be discarded for making processing more efficient.

G. Processing Procedure

A procedure of processing performed in game system 1 according to the present embodiment will now be described with reference to FIGS. 9 and 10.

Figure 9:
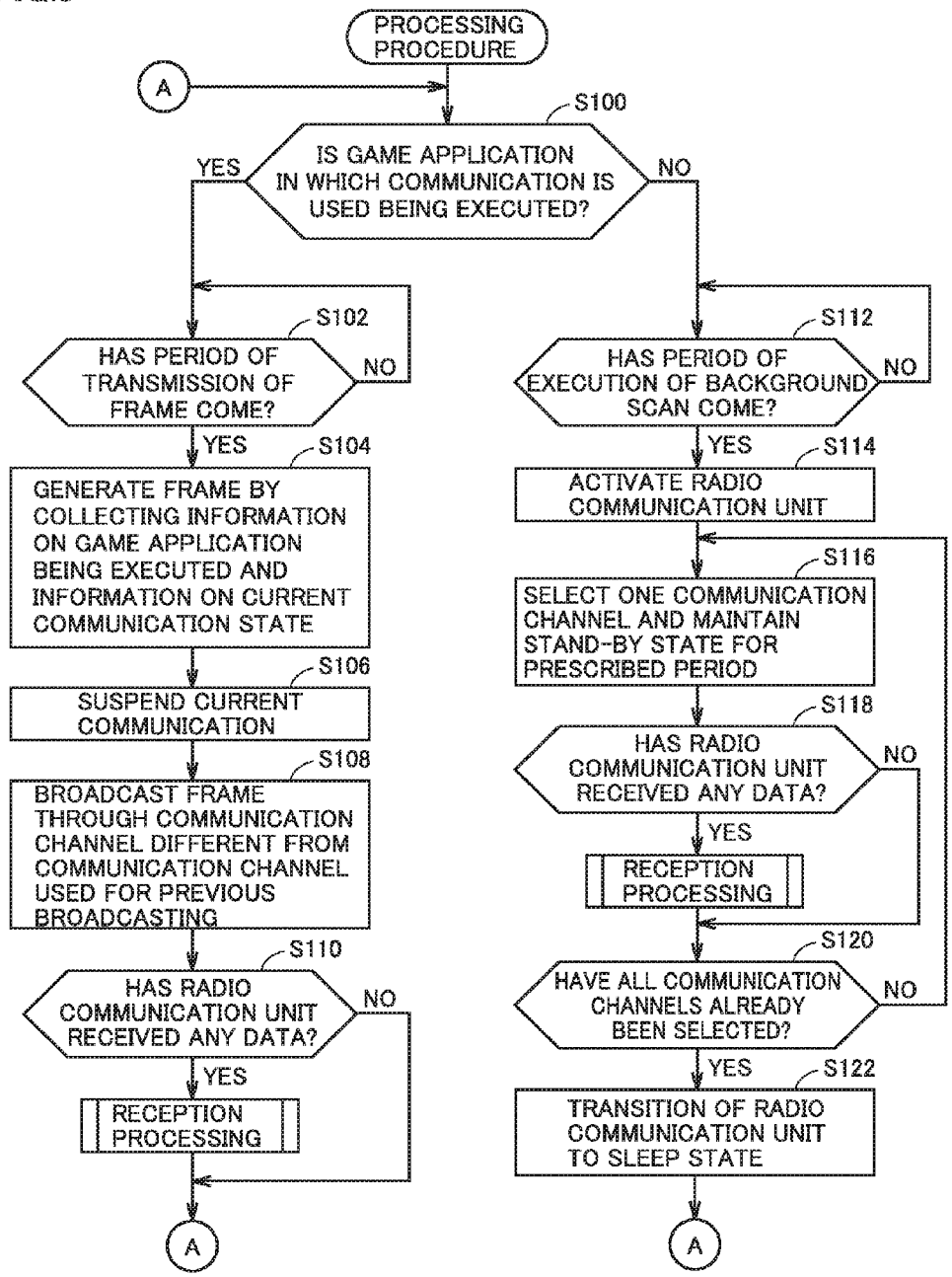
FIG. 9 shows an exemplary illustrative non-limiting drawing illustrating a flowchart showing a processing procedure performed in the game system according to the present embodiment.
Figure 10:
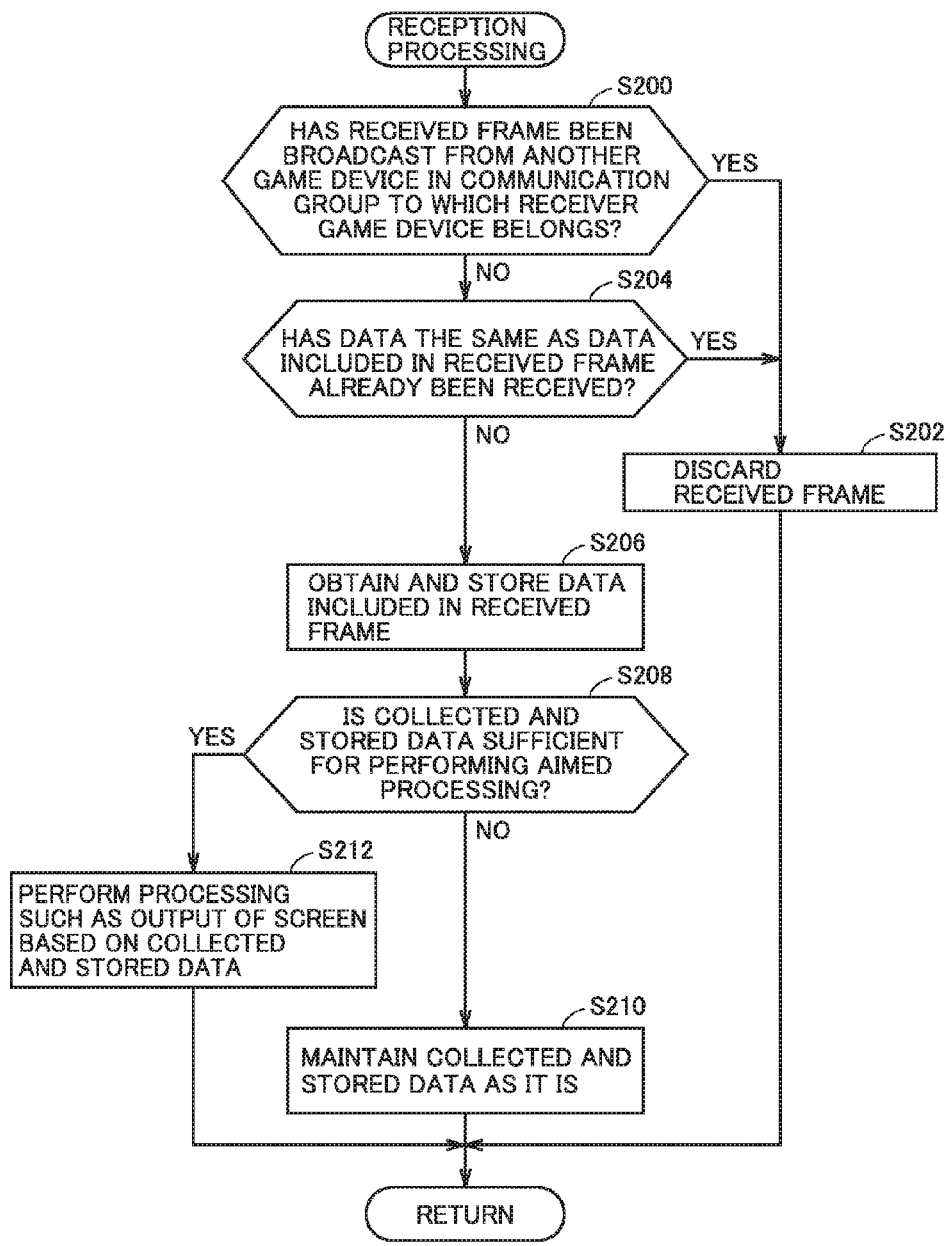
FIG. 10 shows an exemplary illustrative non-limiting drawing illustrating a flowchart showing a processing procedure in reception processing shown in FIG. 9.

Each step shown in FIGS. 9 and 10 is typically performed by execution of OS 108 and application program 110 by processor 102.

Referring to FIG. 9, processor 102 determines whether or not a game application in which communication is used is being executed (step S100). Whether or not communication is carried out through any one communication channel among a plurality of communication channels is determined.

When a game application in which communication is used is being executed (YES in step S100), a frame is periodically broadcast. Specifically, processor 102 determines whether or not a period of transmission of a frame has come (step S102). When a period of transmission of a frame has not yet come (NO in step S102), the period of transmission of a frame is awaited. When the period of transmission of a frame has come (YES in step S102), processor 102 generates a frame by collecting information on a game application being executed and information on a current communication status (step S104). Then, processor 102 instructs radio communication unit 120 to suspend current communication (unicast/multicast) (step S106) and broadcasts the frame generated in step S104 through a communication channel different from the communication channel through which the frame was previously broadcast (step S108).

Then, processor 102 determines whether or not radio communication unit 120 has received any data (step S110). When radio communication unit 120 has received some data (YES in step S110), reception processing in step S200 and later is performed. When radio communication unit 120 has received no data (NO in step S110), processing in step S100 and later is repeated.

In contrast, when a game application in which communication is used is not being executed (NO in step S100), background scan is carried out. More specifically, processor 102 determines whether or not a period to carry out background scan has come (step S112). When a period to carry out background scan has not yet come (NO in step S112), the period to carry out background scan is awaited. When the period to carry out background scan has come (YES in step S112), processor 102 gives an instruction to radio communication unit 120 and activates radio communication unit 120 (step S114), selects one communication channel among a plurality of communication channels, and maintains a stand-by state for a prescribed period (step S116). Then, processor 102 determines whether or not radio communication unit 120 has received any data (step S118). When radio communication unit 120 has received some data (YES in step S118), reception processing in step S200 and later is performed.

When radio communication unit 120 has received no data (NO in step S118) or after reception processing in step S200 and later is performed, processor 102 determines whether or not all communication channels of the plurality of communication channels have been selected (step S120). When there is a communication channel which has not yet been selected among the plurality of communication channels (NO in step S120), processing in step S116 is performed. When all communication channels among the plurality of communication channels have been selected (YES in step S120), processor 102 instructs radio communication unit 120 to make transition to the sleep state (step S122) and performs again processing in step S100 and later.

Referring to FIG. 10, processor 102 determines whether or not the received frame has been broadcast from another game device in the communication group to which the game device including the processor belongs, based on the identification information (the BSSID and/or the MAC address) included in the received frame (step S200).

When the received frame has been broadcast from another game device in the communication group to which the game device including the processor belongs (YES in step S200), processor 102 discards the received frame (step S202). Then, the process returns to the corresponding step in the flowchart shown in FIG. 9.

In contrast, when the received frame has not been broadcast from another game device in the communication group to which the game device including the processor belongs (NO in step S200), processor 102 determines whether or not data the same as the data included in the received frame has already been received (step S204). When data the same as the data included in the received frame has already been received (YES in step S204), processor 102 discards the received frame (step S202). Then, the process returns to the corresponding step in the flowchart shown in FIG. 9.

When data the same as the data included in the received frame has not yet been received (NO in step S204), processor 102 obtains and stores the data included in the received frame (step S206) and determines whether or not the collected and stored data (including previously collected and stored data) is sufficient for performing aimed processing (step S208).

When the collected and stored data is not sufficient for performing the aimed processing (NO in step S208), the collected and stored data is maintained as it is (step S210) and the process returns to the corresponding step in the flowchart shown in FIG. 9.

When the collected and stored data is sufficient for performing the aimed processing (YES in step S208), processor 102 performs processing such as output of a screen based on the collected and stored data (with the previously collected and stored data being added as necessary) (step S212). Then, the process returns to the corresponding step in the flowchart shown in FIG. 9.

H. Advantages

According to the game system according to the present embodiment, even when specific game devices form a communication group and communicate with one another, another game device present within an area where a frame broadcast from the communication group can be received can obtain various types of information such as information on progress of a game application executed in the communication group. A user of another game device can be interested in the game application executed in the communication group by knowing the obtained various types of information and can also positively be involved, for example, by watching or participating in the game application.

Thus, according to the game system according to the present embodiment, various types of information can readily be exchanged without establishing specific connection in advance among game devices, and consequently, communication among users through game devices can be promoted.

While certain example systems, methods, devices, and apparatuses have been described herein, it is to be understood that the appended claims are not to be limited to the systems, methods, devices, and apparatuses disclosed, but on the contrary, are intended to cover various modifications and equivalent arrangements included within the spirit and scope of the appended claims.

What is claimed is:

1. A game system comprising first and second game devices,
   each of the first and second game devices comprising a radio configured for communication using any one communication channel of a plurality of communication channels,
   the first game device including a first processor configured to control the radio to switch from a first communication channel being used for original communication to a second communication channel other than the first communication channel and broadcast a first frame including data, and to switch back to the first communication channel and continue the original communication after broadcast of the first frame, and
   the second game device including a second processor configured to perform, when the radio of the second game device is controlled to use the second communication channel and receive the first frame through the second communication channel, processing of the received first frame.

2. The game system according to claim 1, wherein
the first processor is configured to control the radio of the first game device to immediately switch back to the first communication channel after broadcast of the first frame, without communicating with any game device receiving the first frame.

3. The game system according to claim 1, wherein
the first processor is configured to control the radio of the first game device to switch to a third communication channel other than the first communication channel while the original communication continues and broadcast a second frame.

4. The game system according to claim 1, wherein
the data in the first frame includes information relating to a game application executed by the first game device, in which communication is used.

5. The game system according to claim 4, wherein
the second processor is configured to control simultaneously presenting, when the second game device is executing an application different from the game application executed in the first game device, information on the game application included in the received first frame together with an image of the application being executed.

6. The game system according to claim 1, wherein
the second processor is configured to control presenting information based on the data included in the received first frame.

7. The game system according to claim 1, wherein
the second processor is configured to control the radio of the second game device to switch to the first communication channel based on the received first frame and to communicate with the first game device.

8. The game system according to claim 1, wherein
the first processor is configured to control the radio of the first game device to also broadcast the frame through the first communication channel.

9. The game system according to claim 1, wherein
the radio of the second game device is configured to scan a frame broadcast from the first game device independently of an application being executed by the second game device.

10. The game system according to claim 1, wherein
the original communication is by unicast or multicast and the unicast or multicast is suspended to broadcast the first frame.

11. The game system according to claim 1, wherein
the original communication through the first communication channel comprises mater/slave communication, and
the first processor is configured to control the radio of the first game device to broadcast the frame regardless of whether the first game device the master or the slave.

12. The game system according to claim 1, wherein
the data in the first frame includes information about the first communication channel.

13. The game system according to claim 1, wherein
the data in the first frame includes identification information about a communication group to which the first game device belongs, and
the second processor is configured to determine whether to process the data included in the received first frame based on the identification information.

14. The game system according to claim 1, wherein
the second processor is configured to perform, when the second game device newly receives a second frame including data different from the data included in the first frame, processing of the second frame.

15. A non-transitory computer-readable storage medium encoded with a processing program that, when executed by a processor of a game device comprising a radio configured for communication using any one communication channel of a plurality of communication channels, causes the game device to perform:
switching from a first communication channel being used for original communication to a second communication channel other than the first communication channel and broadcasting a first frame including data for processing by another game device that receives the first frame; and
switching back to the first communication channel and continuing the original communication after broadcasting of the first frame.

16. A processing method performed in a game device comprising a radio configured for communication using any one communication channel of a plurality of communication channels, the processing method comprising:
switching from a first communication channel being used for original communication to a second communication channel other than the first communication channel and broadcasting a frame including data for processing by another game device that receives the first frame; and
switching back to the first communication channel and continuing the original communication after broadcasting of the first frame.

17. A game device comprising:
a radio configured for communication using any one communication channel of a plurality of communication channels; and
a processor configured to control the radio to switch from a first communication channel being used for original communication to a second communication channel other than the first communication channel and broadcast a first frame including data for processing by another game device that receives the first frame, and to switch back to the first communication channel and continue the original communication after broadcast of the first frame.

18. An information processing apparatus comprising:
a processor configured to set any of a first mode for the information processing apparatus to operate as a master device and a second mode for the information processing apparatus to operate as a slave device;
a radio configured to communicate with another information processing apparatus in a mode set by the processor, wherein
the processor is configured to suspend communication being carried out by the radio and broadcast a frame including data regardless of whether the mode set by the processor is the first mode or the second mode.

* * * * *